United States Patent
Saito et al.

(10) Patent No.: US 7,608,009 B2
(45) Date of Patent: Oct. 27, 2009

(54) PLANETARY GEAR TYPE TRANSMISSION

(75) Inventors: Daisuke Saito, Kariya (JP); Satoshi Munakata, Nishikamo-gun (JP)

(73) Assignees: Aisin Ai Co., Ltd., Nishio-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 406 days.

(21) Appl. No.: 11/716,006

(22) Filed: Mar. 9, 2007

(65) Prior Publication Data
US 2007/0225112 A1    Sep. 27, 2007

(30) Foreign Application Priority Data
Mar. 24, 2006    (JP)    ............... 2006-083238

(51) Int. Cl.
*F16H 3/44*    (2006.01)
(52) U.S. Cl. .................................... 475/326
(58) Field of Classification Search ........... None
See application file for complete search history.

(56) References Cited
U.S. PATENT DOCUMENTS

| | | | | |
|---|---|---|---|---|
| 1,581,695 A | * | 4/1926 | Starr | 475/280 |
| 1,634,168 A | * | 6/1927 | Ahlm | 475/172 |
| 4,873,892 A | * | 10/1989 | Ohkubo | 475/237 |
| 5,842,947 A | * | 12/1998 | Weilant | 475/323 |
| 7,534,188 B2 | * | 5/2009 | Pritchard et al. | 475/323 |

FOREIGN PATENT DOCUMENTS

JP    2002-321541 A    11/2002

* cited by examiner

*Primary Examiner*—Dirk Wright
(74) *Attorney, Agent, or Firm*—Buchanan Ingersoll & Rooney PC

(57) ABSTRACT

A planetary gear type transmission includes a planetary gear mechanism including a sun gear, a ring gear, and a planetary carrier which all have the same axis, an output shaft having the same axis as the planetary gear mechanism, a sleeve supported movable in an axial direction by the output shaft, an inner piece connected to the sleeve while the sleeve is approaching the planetary gear mechanism and including a first inner spline, and an outer piece connected to the sleeve while the sleeve is separating from the planetary gear mechanism and including a second outer spline. The sleeve includes a first outer spline fitted to the first inner spline and a second inner spline fitted to the second outer spline. A distance between the second inner spline and the planetary gear mechanism is smaller than a distance between the first outer spline and the planetary gear mechanism.

4 Claims, 3 Drawing Sheets

PLANETARY GEAR TYPE TRANSMISSION

CROSS REFERENCE TO RELATED APPLICATIONS

This application is based on and claims priority under 35 U.S.C. § 119 to Japanese Patent Application No. 2006-83238, filed on Mar. 24, 2006, the entire content of which is incorporated herein by reference.

FIELD OF THE INVENTION

This invention generally relates to a transmission equipped with a planetary gear mechanism.

BACKGROUND

A small size planetary gear type transmission in which an input side and an output side have the same axis is frequently used in a vehicle. For example, a transfer apparatus for a full time four-wheel-drive vehicle disclosed in JP2002-321541A includes two sets of planetary gear mechanisms intended for reducing an overall length of the apparatus. The planetary gear mechanism normally includes three elements, i.e. a sun gear, a ring gear, and a planetary carrier which all have the same axis. Then, a transmission can be constituted by allocating functions of an input element, a reaction element, and an output element to the sun gear, the ring gear, and the planetary carrier, or by switching the functions therebetween. Further, multiple functions can be used or the functions can be combined with the other gear mechanism, thereby achieving a wide range of application.

In order to improve a vehicle performance, it is very important to reduce a total weight of a vehicle. In the planetary gear type transmission, a size of each component is restricted depending on an amount of rotation power to be transmitted. However, reductions in size and weight proceed by reconsideration of its design. Further reductions in size and weight are strongly desired while securing strength.

Thus, a need exists for a planetary gear type transmission with further reduced size and weight.

SUMMARY OF THE INVENTION

According to an aspect of the present invention, a planetary gear type transmission includes a planetary gear mechanism including a sun gear, a ring gear, and a planetary carrier which all have the same axis, one of the sun gear, the ring gear and the planetary carrier serving as an input element connected to an input shaft, another one apart from the one serving as the input element serving as a reaction element, and the others apart from the one serving as the reaction element each serving as an output element, an output shaft having the same axis as the planetary gear mechanism, and a sleeve having a cylindrical shape and supported so as to be movable in an axial direction by the output shaft. One of the output elements is provided close to the axis while the other one of the output elements is provided at a distance from the axis. The planetary gear type transmission further includes an inner piece connected to the one of the output elements and connected to the sleeve while the sleeve is approaching the planetary gear mechanism, the inner piece including a first inner spline, and an outer piece connected to the other one of the output elements and connected to the sleeve while the sleeve is separating from the planetary gear mechanism, the outer piece including a second outer spline. The sleeve includes a first outer spline at an inner peripheral surface and a second inner spline at an outer peripheral surface, the first outer spline fitted to the first inner spline and the second inner spline fitted to the second outer spline. A distance between the second inner spline and the planetary gear mechanism is smaller than a distance between the first outer spline and the planetary gear mechanism.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
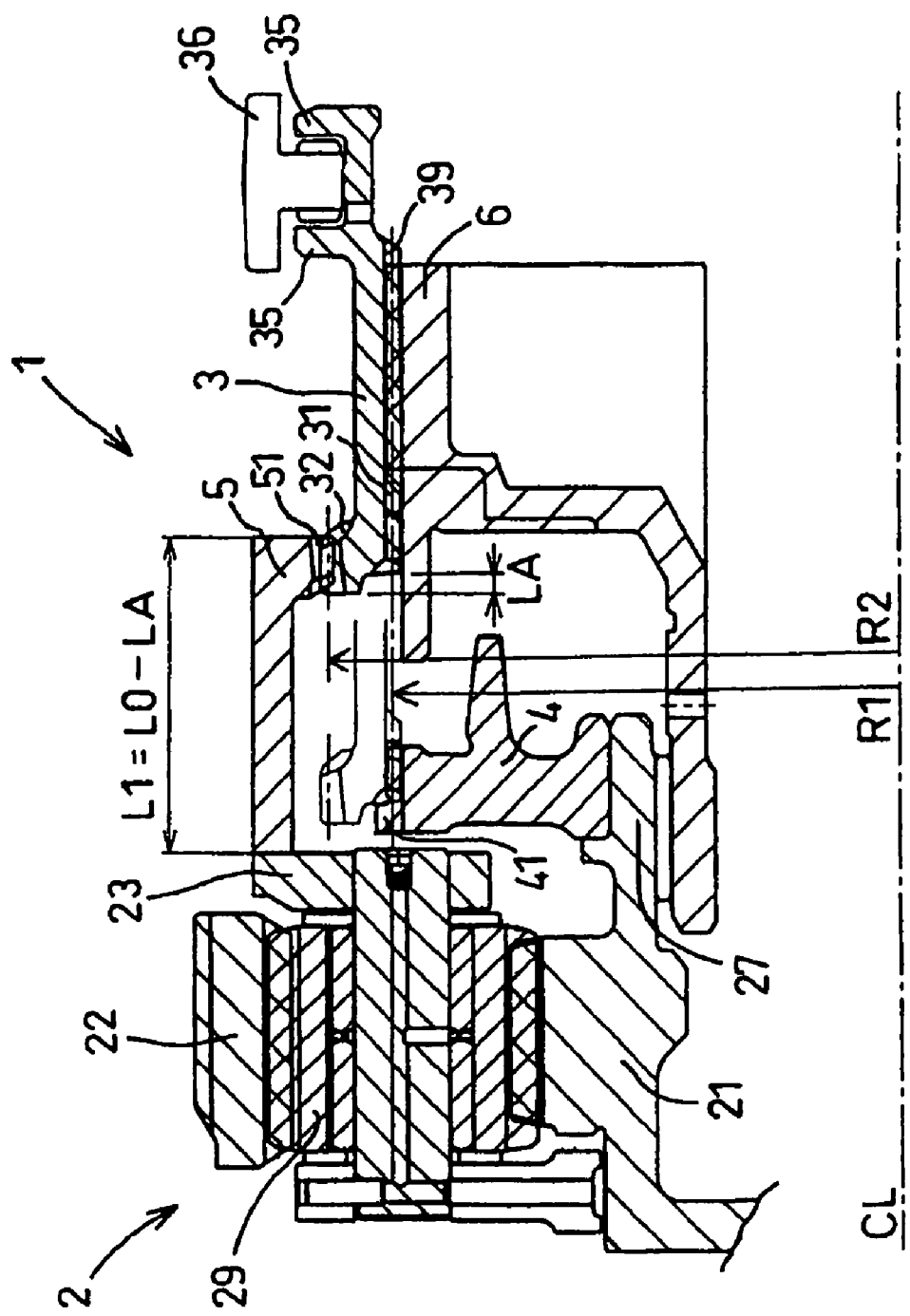
FIG. 1 is a cross-sectional view of a planetary gear type transmission according to an embodiment of the present invention.
Figure 2A:
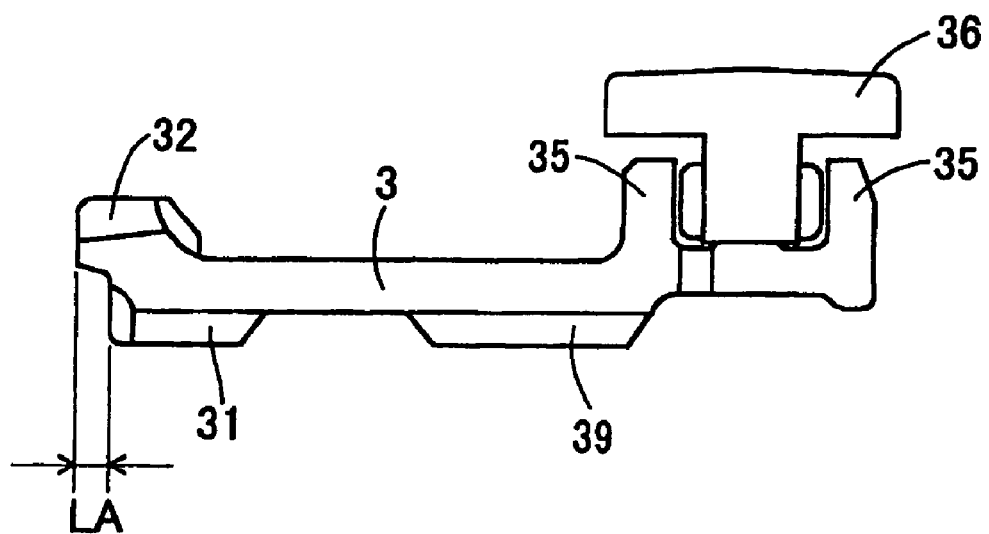
FIG. 2A is an enlarged cross-sectional view of a sleeve according to the embodiment of the present invention.
Figure 2B:
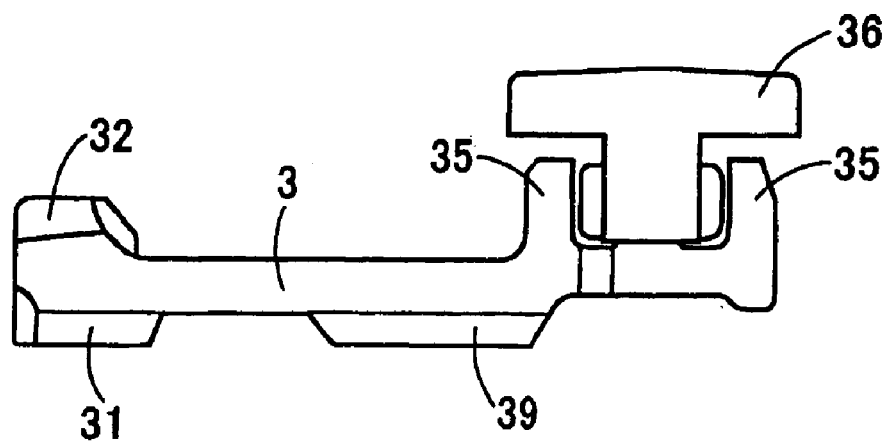
FIG. 2B is an enlarged cross-sectional view of a sleeve according to a conventional invention.
Figure 3:
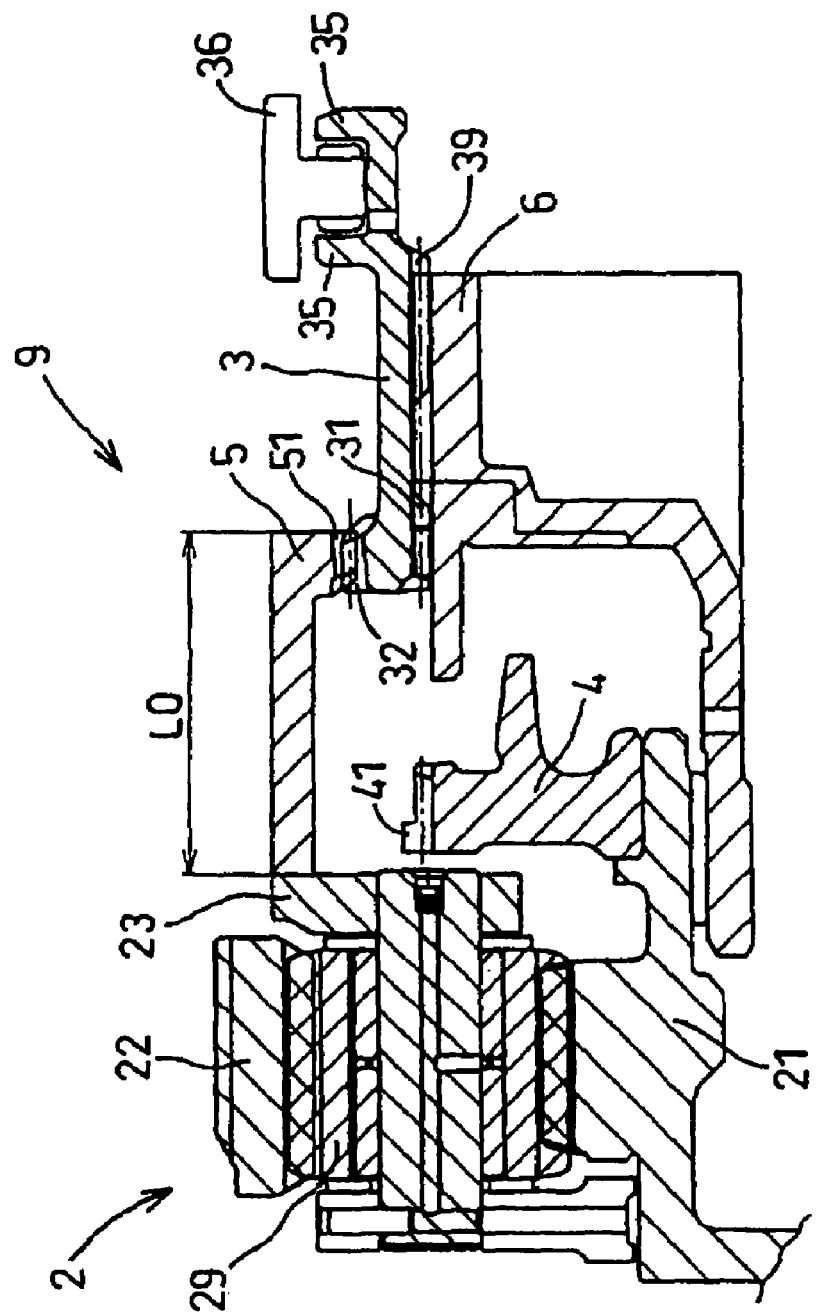
FIG. 3 is a cross-sectional view of a planetary gear type transmission according to a conventional invention.

An embodiment of the present invention will be explained with reference to FIGS. 1 to 3. FIG. 1 is a cross-sectional view of a planetary gear type transmission 1 according to the present embodiment. In FIG. 1, only one side of a centerline CL, i.e. a half portion of the planetary gear type transmission 1, is shown. The planetary gear type transmission 1 includes a planetary gear mechanism 2, a sleeve 3, an inner piece 4, and an outer piece 5.

The planetary gear mechanism 2 includes a sun gear 21 on a center side (i.e. inner side) and a ring gear 22 on a circumferential side (i.e. outer side) both having the same axis, i.e. centerline CL. Multiple planetary gears 29 are arranged between the sun gear 21 and the ring gear 22 so as to engage with both the sun gear 21 and the ring gear 22. Each center portion of the planetary gears 29 is rotatably supported by a planetary carrier 23 so that the planetary gears 29 can rotate and also move around the centerline CL. The sun gear 21 is connected to an input shaft (not shown) provided on a left side in FIG. 1. The inner piece 4 is provided on a right side on an outer periphery. That is, the sun gear 21 functions as both an input element and an output element. The ring gear 22 is fixed to a transmission case (not shown) so as to function as a reaction element. The planetary carrier 23 functions as an output element as the outer piece 5 is provided on a right side of the planetary carrier.

Precisely, the inner piece 4 is integrally formed on an outer periphery of a projecting portion 27 projecting in a rightward direction of the sun gear 21. A first inner spline 41 having a fitting center radius R1 is formed on an outer periphery of the inner piece 4. The outer piece 5 is integrally formed on the right side of the planetary carrier 23. The outer piece 5 is provided so as to project in a rightward direction. Then, a second outer spline 51 with a fitting center radius R2 is provided at a right end portion on an inner peripheral side of the outer piece 5. The fitting center radius R1 is smaller than the fitting center radius R2.

The sleeve 3 has a substantially cylindrical shape and spline fitted to an output shaft 6. An outer spline 39 fitted to the output shaft 6 is provided on a right side on an inner periphery of the sleeve 3. In addition, a first outer spline 31 with the fitting center radius R1 is provided at a left end on the inner periphery of the sleeve 3. A left end portion of an outer peripheral surface of the sleeve 3 extends in a leftward direction by a dimension LA, for example, from a left end portion of an inner peripheral surface. Then, a second inner spline 32 with the fitting center radius R2 is formed at the left end portion of the outer peripheral surface of the sleeve 3. FIG. 2A is an enlarged cross-sectional view of the sleeve 3 according to the present embodiment while FIG. 2B is an enlarged cross-sectional view of a sleeve 3 according to a conventional invention. As shown in FIG. 2B, a first outer spline 31 and a second inner spline 32 are formed at axially identical positions on the inner periphery and the outer periphery, respectively, of the sleeve 3. On the other hand, as shown in FIG. 2A, the second inner spline 32 is formed in a leftward direction towards the planetary gear mechanism 2 by the dimension LA from the first outer spline 31 according to the present embodiment.

Two projections 35 are arranged on the right side on the outer periphery of the sleeve 3 and between which an operation lever 36 is connected. The operation lever 36 is driven by an actuator (not shown) so as to operate the sleeve 3 in leftward and rightward directions.

Next, an operation of the planetary gear type transmission 1 will be explained below. When the sleeve 3 is operated to move in the leftward direction by the operation lever 36 so as to approach the planetary gear mechanism 2, the first outer spline 31 is fitted to the first inner spline 41 of the inner piece 4. At this time, a rotation power is directly transmitted from the input shaft to the output shaft 6 through the sun gear 21, the inner piece 4, and the sleeve 3 with a gear ratio of 1:1. Meanwhile, when the sleeve 3 is operated to move in the rightward direction by the operation lever 36 so as to be away from the planetary gear mechanism 2, the second inner spline 32 is fitted to the second outer spline 51 of the outer piece 5. At this time, the rotation power is decelerated and transmitted from the input shaft to the output shaft 6 through the sun gear 21, the planetary gears 29, the planetary carrier 23, the outer piece 5, and the sleeve 3. The sleeve 3 can be also arranged in an intermediate position between the position at which the first outer spline 31 is fitted to the first inner spline 41 of the inner piece 4 and the position at which the second inner spline 32 is fitted to the second outer spline 51 of the outer piece 5. That is, the sleeve 3 is fitted to neither the inner piece 4 nor the outer piece 5 so as not to transmit the rotation power.

According to the aforementioned embodiment, the sleeve 3 moves in the axial direction to select the output element of the planetary gear mechanism 2 so that the sleeve 3 is connected to that selected output element, thereby achieving a predetermined gear ratio. The two output elements, i.e. the sun gear 21 and the planetary carrier 23 in the present embodiment, have the same axis so that the two output elements are arranged in a concentric manner.

The inner piece 4 is a member that is connected to the output element provided close to the centerline CL (i.e. sun gear 21) so as to rotate as a unit therewith. The first inner spline 41 with the fitting center radius R1 is formed on the outer periphery of the inner piece 4. Meanwhile, the outer piece 5 is a member that is connected to the output element provided at a distance from the centerline CL (i.e. planetary carrier 23) so as to rotate as a unit therewith. The second outer spline 51 with the fitting center radius R2 that is greater than the fitting center radius R1 is formed on the inner periphery of the outer piece 5.

The sleeve 3 is supported by the output shaft 6 by means of a spline fitting, for example. The sleeve 3 is movable in the axial direction and at the same time not slidable in a rotation direction when transmitting the rotation power.

The sleeve 3 can have an outer spline that is spline fitted to both the inner piece 4 and the output shaft 6. The spline fitting can be used so that the sleeve 3 is supported by the output shaft 6 in an axially movable manner. At this time, a radius of a fitting center to the output shaft 6 of the outer spline can be equal to the fitting center radius R1 to the inner piece 4. Further, a shape of an inner spline of the output shaft 6 can be equal to that of the first inner spline of the inner piece 4. Accordingly, the sleeve 3 can be fitted to both the inner piece 4 and the output shaft 6 by means of the single outer spline, thereby achieving a simple and effective spline processing of components.

The sun gear 21 serves as the input element by being connected to the input shaft and also serves as the output element on the inner side by being formed with the inner piece 4 as a unit. In addition, the ring gear 22 serves as the reaction element by being fixed to the transmission case. Further, the planetary carrier 23 serves as the output element on the outer side by being formed with the outer piece 5 as a unit.

An effect of the planetary gear type transmission 1 will be explained below. FIG. 3 is a cross-sectional view of a planetary gear type transmission 9 according to a conventional invention. In FIG. 3, only one side of a centerline CL, i.e. a half portion of the planetary gear type transmission 9, is shown. In addition, substantially same parts or components shown in FIGS. 1 and 3 bear the same numbers. FIGS. 1 and 3 each show a state in which the outer piece 5 and the sleeve 3 are fitted to each other. A distance between the first outer spline 31 and the first inner spline 41 is same in FIGS. 1 and 3 for the purposes of securing the intermediate position between the position at which the first outer spline 31 is fitted to the first inner spline 41 and the position at which the second inner spline 32 is fitted to the second outer spline 51. Then, a position of the second outer spline 51 in FIG. 1 is closer to the planetary gear mechanism 2 by the dimension LA than the position of the second outer spline 51 in FIG. 3. Accordingly, an axial length L1 of the outer piece 5 in the present embodiment can be reduced by the dimension LA from a conventional length L0 of the outer piece 5 in the conventional invention. Further, along with the reduction of the axial length of the outer piece 5, a mechanical strength can be still secured even if a thickness of the outer piece 5 in the radical direction is decreased, thereby achieving reductions in size and weight of the transmission.

At this time, as long as the sleeve 3 is prevented from making in contact with the planetary gear mechanism 2 when the inner piece 4 and the sleeve 3 are fitted to each other, a length of the dimension LA can be optimized.

According to the aforementioned embodiment, the planetary gear type transmission 1 has a simple structure with a single input element and two output elements. Thus, usage of multiple planetary gear mechanisms by applying the present embodiment or a combination with the other gear mechanism can achieve a transmission with a wide gear range.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A planetary gear type transmission comprising:

a planetary gear mechanism including a sun gear, a ring gear, and a planetary carrier which all have the same axis, one of the sun gear, the ring gear and the planetary carrier serving as an input element connected to an input shaft, another one apart from the one serving as the input element serving as a reaction element, and the others apart from the one serving as the reaction element each serving as an output element;

an output shaft having the same axis as the planetary gear mechanism;

a sleeve having a cylindrical shape and supported so as to be movable in an axial direction by the output shaft;

one of the output elements provided close to the axis while the other one of the output elements provided at a distance from the axis;

an inner piece connected to the one of the output elements and connected to the sleeve while the sleeve is approaching the planetary gear mechanism, the inner piece including a first inner spline;

an outer piece connected to the other one of the output elements and connected to the sleeve while the sleeve is separating from the planetary gear mechanism, the outer piece including a second outer spline; and the sleeve including a first outer spline at an inner peripheral surface and a second inner spline at an outer peripheral surface, the first outer spline fitted to the first inner spline and the second inner spline fitted to the second outer spline, and a distance between the second inner spline and the planetary gear mechanism being smaller than a distance between the first outer spline and the planetary gear mechanism.

2. A planetary gear type transmission according to claim 1, wherein the sleeve includes an outer spline that is spline fitted to the inner piece and the output shaft.

3. A planetary gear type transmission according to claim 1, wherein the sun gear serves as the input element and the output element provided close to the axis, the ring gear serves as the reaction element, and the planetary carrier serves as the output element provided at a distance from the axis.

4. A planetary gear type transmission according to claim 2, wherein the sun gear serves as the input element and the output element provided close to the axis, the ring gear serves as the reaction element, and the planetary carrier serves as the output element provided at a distance from the axis.

* * * * *